(12) United States Patent
Kochan, Jr. et al.

(10) Patent No.: US 9,791,296 B2
(45) Date of Patent: Oct. 17, 2017

(54) SYSTEM AND METHOD OF SYNCHRONOUSLY SWITCHING ELECTRICAL PHASES OF A PERMANENT MAGNET SYNCHRONOUS MOTOR

(71) Applicant: Metropolitan Industries, Inc., Romeoville, IL (US)

(72) Inventors: John R. Kochan, Jr., Naperville, IL (US); John Brian Dempster, Floyds Knobs, IN (US); James A. Nimmer, Minooka, IL (US)

(73) Assignee: METROPOLITAN INDUSTRIES, INC., Romeoville, IL (US)

( * ) Notice: Subject to any disclaimer, the term of this patent is extended or adjusted under 35 U.S.C. 154(b) by 109 days.

(21) Appl. No.: 14/704,039

(22) Filed: May 5, 2015

(65) Prior Publication Data
US 2016/0327410 A1    Nov. 10, 2016

(51) Int. Cl.
*H02K 29/08*    (2006.01)
*G01D 5/14*    (2006.01)
*H02P 6/16*    (2016.01)
*G01D 5/245*    (2006.01)

(52) U.S. Cl.
CPC ............. *G01D 5/147* (2013.01); *G01D 5/245* (2013.01); *H02P 6/16* (2013.01)

(58) Field of Classification Search
CPC .................................. G01D 5/147; H02P 6/16
USPC ...................................................... 318/400.39
See application file for complete search history.

(56) References Cited

U.S. PATENT DOCUMENTS

| | | | | |
|---|---|---|---|---|
| 4,373,486 | A * | 2/1983 | Nichols | F02P 7/07 123/617 |
| 4,782,272 | A * | 11/1988 | Buckley | H02K 29/08 318/400.01 |
| 4,882,524 | A * | 11/1989 | Lee | H02K 29/10 318/400.4 |
| 6,163,148 | A * | 12/2000 | Takada | B62M 6/45 180/206.3 |
| 2012/0155243 | A1* | 6/2012 | Yokoyama | G11B 33/08 369/247.1 |
| 2015/0185047 | A1* | 7/2015 | Kouno | G01D 5/145 324/251 |
| 2016/0268876 | A1* | 9/2016 | Goto | H02K 21/44 |

* cited by examiner

*Primary Examiner* — Erick Glass
(74) *Attorney, Agent, or Firm* — Husch Blackwell LLP; George S. Pavlik

(57) ABSTRACT

Systems and methods of synchronously switching electrical phases of a permanent magnet synchronous motor are provided. Some embodiments can include switching the phase of the motor by employing an encoder that includes a tone wheel affixed to a rotor such that the tone wheel redirects a magnetic field away from Hall effect sensors in a timed manner.

16 Claims, 2 Drawing Sheets

SYSTEM AND METHOD OF SYNCHRONOUSLY SWITCHING ELECTRICAL PHASES OF A PERMANENT MAGNET SYNCHRONOUS MOTOR

FIELD

The present invention relates generally to permanent magnet synchronous motors. More particularly, the present invention relates to a system and method of synchronously switching electrical phases of a permanent magnet synchronous motor.

BACKGROUND

Permanent magnet synchronous motors are known in the art and require that the phases of the motor be switched in sync with the rotating magnetic field of motor's rotor. Brushes and commutators have been known to achieve such synced switching. However, improved systems and methods are desired.

DETAILED DESCRIPTION

Figure 1:
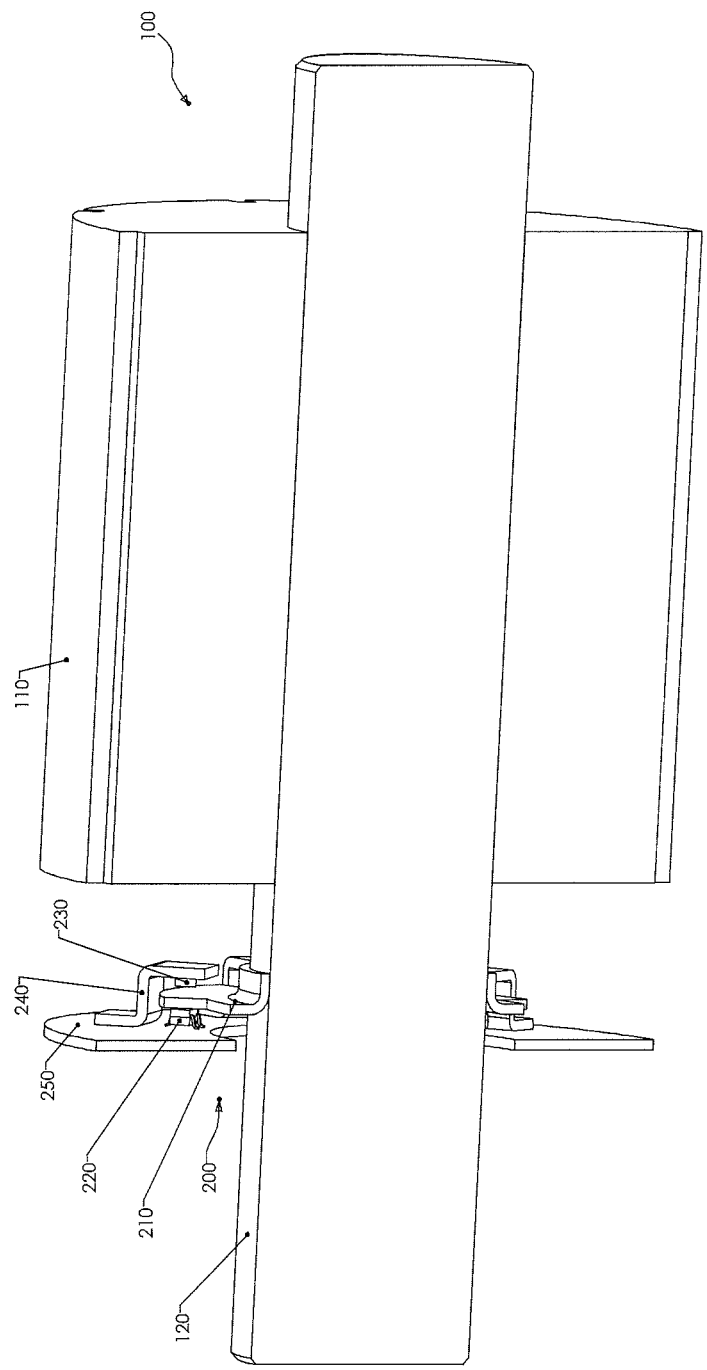
FIG. 1 is a cross-sectional view of a rotor assembly of a permanent magnet synchronous motor and an encoder in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a system and method of synchronously switching electrical phases of a permanent magnet synchronous motor. For example, some embodiments can include switching the phase of a permanent magnet synchronous motor by employing an encoder that includes a tone wheel affixed to a rotor such that the tone wheel redirects a magnetic field away from Hall effect sensors in a timed manner.

In accordance with disclosed embodiments, an encoder as disclosed herein can include a tone wheel or any other magnetic permeable disk or ring that can be attached to and rotate with a rotor system. The tone wheel can include a plurality of flux return lobes along the circumference thereof separated by a plurality of teeth. Therefore, in some embodiments, the circumference of the tone wheel is not even. Instead, the radius of the tone wheel can be larger in portions of the wheel having a lobe and smaller in portions of the wheel having a tooth, that is, without a lobe.

The encoder can also include a plurality of Hall effect sensors, a plurality of permanent magnets, and a plurality of flux return devices, such that each Hall effect sensor can be associated with a respective permanent magnet, and each permanent magnet can be associated with a respective flux return device. For example, each permanent magnet can be attached to a flux return device, which can be a magnetic permeable structure. In some embodiments, each Hall effect sensor and each flux return device can be attached to a fixed component in such a way that a predetermined distance or clearance between the Hall effect sensor and a respective permanent magnet associated with the flux return device is constant.

In the absence of the tone wheel or any part thereof being disposed within the clearance between the magnet and the sensor, each permanent magnet can supply a magnetic field through a respective Hall effect sensor associated therewith. However, as the tone wheel rotates, a lobe can rotate into the clearance between the Hall effect sensor and the respective permanent magnet, thereby providing a magnetic path with higher magnetic permeability and thereby reducing the magnetic field acting on the sensor. In some embodiments, the reduction on the magnetic field acting on the Hall effect sensor can create an absence of a magnetic field on the sensor.

Each Hall effect sensor can switch according to the magnetic field acting thereon. For example, in some embodiments, the Hall effect sensor can output a high voltage in the presence of a magnetic field, that is, when a permanent magnet is supplying a magnetic field to the sensor, and output a low voltage in the absence of a magnetic field, that is, when a lobe of the tone wheel is redirecting the magnetic field from the permanent magnet away from the sensor. However, in some embodiments, the Hall effect sensor can output a high voltage in the absence of a magnetic field and output a low voltage in the presence of a magnetic field.

Figure 3:
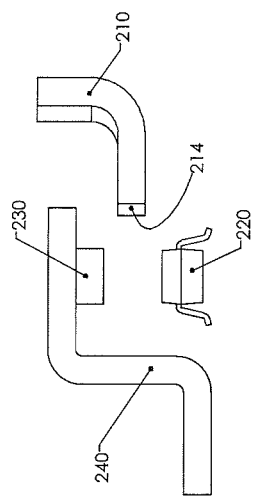
FIG. 3 is a side view of an encoder in a first position.
Figure 4:
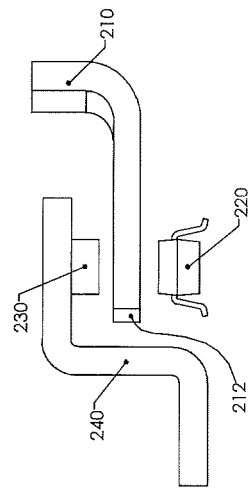
FIG. 4 is a side view of an encoder in a second position.
Figure 2:
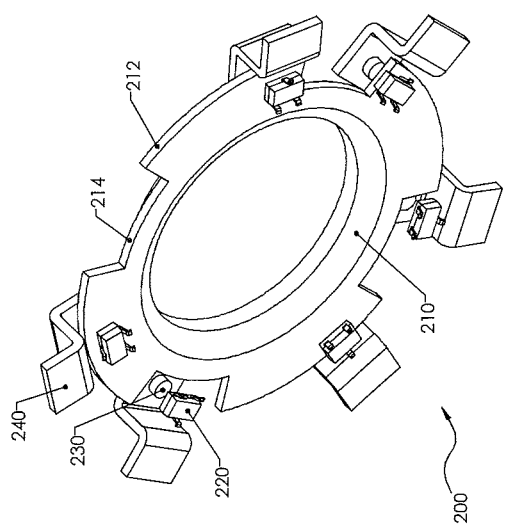
FIG. 2 is a perspective view of an encoder in accordance with disclosed embodiments.

FIG. 1 is a cross-sectional view of a rotor assembly 100 of a permanent magnet synchronous motor and an encoder 200 in accordance with disclosed embodiments. FIG. 2 is a perspective view of the encoder 200, FIG. 3 is a side view of the encoder 200 in a first position, and FIG. 4 is a side view of the encoder 200 in a second position. As seen in the figures, the rotor assembly 100 can include a motor rotor 110 and a motor shaft 120, and the encoder 200 can include a tone wheel 210, a plurality of Hall effect sensors 220, a plurality of permanent magnets 230, a plurality of flux return devices 240, and a mechanical grounding component 250. In some embodiments, each of the flux return devices 240 can include a magnetic permeable structure that can provide a flux path of high magnetic permeability.

The tone wheel 210 can include any magnetic permeable disk or ring that can be attached to and rotate with the shaft 120. As seen, the tone wheel 210 can include a plurality of flux return lobes 212 along the circumference thereof separated by a plurality of teeth 214.

The mechanical grounding component 250 can include, for example, a printed circuit board (PCB) or any other component that is affixed to a housing (not shown) or some other fixed component of the motor that prevents the grounding component 250 from rotating. Each of the Hall effect sensors 220 and flux return devices 240 can be attached to the grounding component 250. Furthermore, each of the permanent magnets 230 can be attached to respective ones of the flux return devices 240 in such a way so as to maintain a fixed predetermined distance between respective ones of the Hall effect sensors 220 and permanent magnets 230. The predetermined distance between each Hall effect sensor 220 and permanent magnet 230 can provide an axial clearance for rotation of the tone wheel 210 therebetween.

The encoder 200 can move between first and second positions according to the rotation of the tone wheel 210. For example, as best seen in FIG. 3, in the first position, the tone wheel 210 can be in position so that each of the plurality of teeth 214 is aligned with respective ones of the Hall effect sensors 220 and permanent magnets 230. That is, no part of the tone wheel 210 is within the clearance between each Hall effect sensor 220 and its respective permanent magnet 230. Accordingly, each permanent magnet 230 can supply a magnetic field to its respective sensor 220, causing the sensor 220 to be in high magnetic flux.

As best seen in FIG. 4, in the second position, the tone wheel 210 can be in position so that each of the plurality of lobes 212 is aligned with respective ones of the Hall effect sensors 220 and permanent magnets 230. That is, a lobe 212 of the tone wheel 210 can be disposed within the clearance between each Hall effect sensor 220 and its respective permanent magnet 230. Accordingly, each lobe 212 can provide a magnetic path of higher permeability, thereby reducing and/or substantially eliminating the magnetic field acting on the sensor 220 and causing the sensor 220 to be in low magnetic flux. That is, the lobe 212 can redirect the magnetic field from the magnet 230, which would otherwise be supplied to the sensor 220.

In some embodiments, a Hall effect sensor 220 can switch to outputting a high voltage when in high magnetic flux and can switch to outputting a low voltage when in low magnetic flux. Alternatively, in some embodiments, a Hall effect sensor 220 can switch to outputting a high voltage when in low magnetic flux and can switch to outputting a low voltage when in high magnetic flux. The switch to high or low voltage can depend on the internal design of the sensor 220, which is not a limitation of the system and method disclosed herein. Instead, embodiments disclosed herein can include alternating and/or interrupting the magnetic flux of a Hall effect sensor 220 by redirecting a magnetic field applied to the sensor 220 in a timed manner.

The encoder 200 disclosed herein can be used to synchronously switch the electrical phase of a permanent magnet synchronous motor with which the encoder 200 is associated. For example, the encoder 200 can cause its Hall effect sensors 220 to synchronously switch, matching the rotating magnetic field of the motor's rotor 110.

In motors with multiple phases, the encoder 200 disclosed herein can synchronously switch each phase of the motor independently. For example, in some embodiments, an encoder 200 can include one or more tone wheels 210, Hall effect sensors 220, permanent magnets 230, and flux return devices 240 for each phase of the motor the encoder 200 is designed to synchronize. Indeed, in some embodiments, an encoder 200 can include two tone wheels 210, two Hall effect sensors 220, two permanent magnets 230, and two flux return devices 240 for each phase of the motor. Accordingly, an encoder 200 used with a 3-phase motor can have six tone wheels 210, six Hall effect sensors 220, six permanent magnets 230, and six flux return devices 240.

Furthermore, each tone wheel 210 of the encoder 200 can include a number of lobes 212 sufficient for causing the Hall effect sensors 220 to synchronously switch, matching the rotating magnetic field of the rotor 110. For example, in some embodiments each tone wheel 210 in the encoder 200 can have a number of lobes 212 that is equal to the number of magnetic pole pairs of the motor. Accordingly, in some embodiments, the tone wheels 210 in an encoder 200 used with an 8-pole pair motor can have eight lobes 212 on each tone wheel 210, and the tone wheels 210 in an encoder 200 used with a 4-pole pair motor can have four lobes 212 on each tone wheel 210.

In some embodiments, at least some of the tone wheels 210, magnets 230, or flux return devices 240 can be common to more than one phase of a motor. For example, an encoder 200 designed to synchronize a three-phase motor can include one tone wheel 210, one magnet 230, and one flux return device 240. However, such an embodiment may still require a number of Hall effect sensors 220 that corresponds to the number of phases of the motor. For example, in some embodiments, the encoder 200 can include a number of Hall effect sensors 220 that is equal to the number of phases of the motor. Therefore, in these embodiments, an encoder 200 synchronizing a three phase motor can include three Hall effect sensors 220. Alternatively, in some embodiments, the encoder 200 can include two Hall effect sensors 220 for each phase of the motor. Therefore, in these embodiments, an encoder synchronizing a three phase motor can include six Hall effect sensors 220.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. An apparatus comprising:
a rotatable tone wheel;
a fixed non-rotating component;
at least one magnetically permeable flux return device coupled to the fixed non-rotating component;
at least one Hall effect sensor fixed to and supported by the fixed non-rotating component; and
at least one permanent magnet attached to the at least one magnetically permeable flux return device so as to maintain a predetermined clearance between the at least one permanent magnet and the at least one Hall effect sensor,
wherein, when the rotatable tone wheel is in a first position, the at least one permanent magnet applies a magnetic field to the at least one Hall effect sensor, causing the at least one Hall effect sensor to be in high magnetic flux,
wherein the rotatable tone wheel includes a plurality of lobes along a circumference thereof separated by respective ones of a plurality of teeth,
wherein the rotatable tone wheel is rotatable into and out of a predetermined clearance between the at least one fixed permanent magnet and the at least one Hall effect sensor such that, when the rotatable tone wheel is in the second position, one of the plurality of lobes is within the redetermined clearance and the magnetic field of the at least one permanent magnet is redirected to the one of the plurality of lobes,
wherein the plurality of lobes and the plurality of teeth lie in a plane substantially perpendicular to an axis of rotation for the rotatable tone wheel, and
wherein, when the rotatable tone wheel is in a second position, the magnetic field of the at least one permanent magnet is redirected to a portion of the tone wheel, causing the at least one Hall effect sensor to be in low magnetic flux.

2. The apparatus of claim 1 wherein the rotatable tone wheel includes a magnetic permeable disk or ring that can be attached to a rotor system for rotation thereof.

3. The apparatus of claim 1 wherein, when the rotatable tone wheel is in the first position, no portion of the rotatable tone wheel is disposed with the predetermined clearance.

4. The apparatus of claim 1 wherein, when the rotatable tone wheel is in the second position, the one of the plurality of lobes provides a magnetic path of higher magnetic permeability relative to other available magnetic paths for the magnetic field.

5. The apparatus of claim 1 wherein, when the rotatable tone wheel is in the second position, the magnetic field applied to the at least one Hall effect sensor is reduced or substantially eliminated.

6. The apparatus of claim 1 wherein the fixed non-rotating component includes a mechanical grounding component.

7. The apparatus of claim 1 wherein the at least one Hall effect sensor switches to outputting a high voltage when in high magnetic flux and switches to outputting a low voltage when in low magnetic flux.

8. The apparatus of claim 1 wherein the at least one Hall effect sensor switches to outputting a high voltage when in low magnetic flux and switches to outputting a low voltage when in high magnetic flux.

9. A method comprising:
rotating a tone wheel with a motor rotor system;
a permanent magnet attached to a magnetically permeable flux return device applying a magnetic field to a Hall effect sensor fixed to and supported by a fixed non-rotating component of the motor rotor system so as to maintain a clearance between the permanent magnet and the Hall effect sensor; and
the tone wheel redirecting the magnetic field away from the Hall effect sensor and towards the tone wheel in a timed manner matching a rotation of the motor rotor system by passing a plurality of lobes disposed along a circumference of the tone wheel and a respective plurality of teeth separating the plurality of lobes into and out of the clearance between the permanent magnet and the Hall effect sensor,
wherein the plurality of lobes and the respective plurality of teeth lie in a plane substantially perpendicular to an axis of rotation for the tone wheel.

10. The method of claim 9 wherein redirecting the magnetic field includes the tone wheel providing a magnetic path of higher magnetic permeability relative to other available magnetic paths for the magnetic field.

11. The method of claim 9 wherein redirecting the magnetic field includes reducing or substantially eliminating the magnetic field applied to the Hall effect sensor.

12. The method of claim 9 further comprising:
applying the magnetic field from the permanent magnet to the Hall effect sensor when the tone wheel is in a first position; and
redirecting the magnetic field away from the Hall effect sensor and towards the tone wheel when the tone wheel is in a second position,
wherein, when the tone wheel is in the first position, the Hall effect sensor is in high magnetic flux, and
wherein, when the tone wheel is in the second position, the Hall effect sensor is in low magnetic flux.

13. The method of claim 12 further comprising:
the Hall effect sensor switching to output a high voltage when in high magnetic flux; and
the Hall effect sensor switching to output a low voltage when in low magnetic flux.

14. The method of claim 12 further comprising:
the Hall effect sensor switching to output a high voltage when in low magnetic flux; and
the Hall effect sensor switching to output a low voltage when in high magnetic flux.

15. The method of claim 9 further comprising switching a phase of a motor synchronously with an alternation between applying and redirecting the magnetic field.

16. A system comprising:
a permanent magnet synchronous motor that includes at least one fixed permanent magnet and at least one fixed Hall effect sensor; and
an encoder that includes at least one rotatable tone wheel attached to a rotor system of the permanent magnet synchronous motor,
wherein the rotatable tone wheel rotates with the rotor system, causing the rotatable tone wheel to alternate between a first position and a second position,
wherein, when the rotatable tone wheel is in the first position, the at least one fixed permanent magnet applies a magnetic field to the at least one fixed Hall effect sensor, causing the at least one fixed Hall effect sensor to be in high magnetic flux,
wherein, when the rotatable tone wheel is in a second position, the magnetic field of the at least one fixed permanent magnet is redirected to a portion of the rotatable tone wheel, causing the at least one fixed Hall effect sensor to be in low magnetic flux,
wherein the rotatable tone wheel includes a plurality of lobes along a circumference thereof separated by respective ones of a plurality of teeth,
wherein the rotatable tone wheel is rotatable into and out of a predetermined clearance between the at least one fixed permanent magnet and the at least one Hall effect sensor such that, when the rotatable tone wheel is in the second position, one of the plurality of lobes is within the predetermined clearance and the magnetic field of the at least one permanent magnet is redirected to the one of the plurality of lobes,
wherein the plurality of lobes and the plurality of teeth lie in a plane substantially perpendicular to an axis of rotation for the rotatable tone wheel, and
wherein a phase of the permanent magnet synchronous motor synchronously switches with an alternation between the at least one fixed permanent magnet applying the magnetic field to the at least one fixed Hall effect sensor and the magnetic field of the at least one fixed permanent magnet being redirected to the portion of the rotatable tone wheel.

* * * * *